(12) United States Patent
Lee

(10) Patent No.: US 12,098,518 B2
(45) Date of Patent: Sep. 24, 2024

(54) VIBRATION RIPPER HAVING LINK STRUCTURE WITH IMPROVED VIBRATION ISOLATING FUNCTION

(71) Applicant: STERLING TECHNOLOGY INC., Hwaseong-si (KR)

(72) Inventor: Sung Chan Lee, Incheon (KR)

(73) Assignee: STERLING TECHNOLOGY INC., Hwaseong-si (KR)

( * ) Notice: Subject to any disclaimer, the term of this patent is extended or adjusted under 35 U.S.C. 154(b) by 631 days.

(21) Appl. No.: 17/298,058

(22) PCT Filed: Nov. 28, 2019

(86) PCT No.: PCT/KR2019/016576
§ 371 (c)(1),
(2) Date: May 28, 2021

(87) PCT Pub. No.: WO2020/116857
PCT Pub. Date: Jun. 11, 2020

(65) Prior Publication Data
US 2022/0120055 A1 Apr. 21, 2022

(30) Foreign Application Priority Data
Dec. 3, 2018 (KR) .......................... 10-2018-0153348

(51) Int. Cl.
*E02F 5/32* (2006.01)
(52) U.S. Cl.
CPC .................... *E02F 5/326* (2013.01)
(58) Field of Classification Search
CPC ...................................... E02F 5/326
USPC .......................................... 172/40
See application file for complete search history.

(56) References Cited

U.S. PATENT DOCUMENTS 8,276,681 B2 * 10/2012 Park ..................... E02F 3/3604
172/40
2017/0306586 A1 10/2017 Park

FOREIGN PATENT DOCUMENTS

| JP | 11-061873 A | 3/1999 |
| KR | 10-2009-0054513 A1 | 6/2009 |
| KR | 10-1224887 B1 | 1/2013 |
| KR | 10-2013-0085134 A | 7/2013 |
| KR | 10-1461597 B1 | 11/2014 |
| KR | 10-1498925 B1 | 3/2015 |

(Continued)

OTHER PUBLICATIONS

International Search Report for PCT/KR2019/016576 mailed Mar. 6, 2020 from Korean Intellectual Property Office.

*Primary Examiner* — Thomas B Will
*Assistant Examiner* — Joel F. Mitchell
(74) *Attorney, Agent, or Firm* — Revolution IP, PLLC

(57) ABSTRACT

A vibration ripper having a link structure with an improved vibration isolating function is characterized by including: a first vibroisolating body installed across the vibration body from a left lower portion of the vibration body; and a link device for connecting the outer body and the first vibroisolating body in order to absorb vibrations, wherein the link device is provided with a pair of connection members which are spaced apart from and parallel to each other, a coupling hole for coupling the first vibroisolating body is formed in the left side of the connection members, and a second vibroisolating body coupled to the outer body is integrally installed on the right side of the connection members.

8 Claims, 6 Drawing Sheets

(56) References Cited

FOREIGN PATENT DOCUMENTS

KR         101532666 B1 * 6/2015
KR         10-1585233 B1   1/2016

* cited by examiner

"A-A"

"B-B"

Prior Art

VIBRATION RIPPER HAVING LINK STRUCTURE WITH IMPROVED VIBRATION ISOLATING FUNCTION

CROSS REFERENCE TO PRIOR APPLICATIONS

This application is a National Stage Application of PCT International Patent Application No. PCT/KR2019/016576 filed on Nov. 28, 2019, under 35 U.S.C. § 371, which claims priority to Korean Patent Application No. 10-2018-0153348 filed on Dec. 3, 2018, respectively, which are all hereby incorporated by reference in their entirety.

TECHNICAL FIELD

The present invention relates to a vibration ripper, and more particularly, to a vibration ripper having a link structure with an improved vibration isolating function so as to effectively absorb and isolate vibrations and impacts in the up and down direction and the left and right direction.

BACKGROUND ART

In general, a vibration ripper refers to heavy equipment used in various construction sites such as new construction and crushing of roads, bridges, buildings, etc., and exerts superior power compared to manpower, thereby improving work efficiency.

In such a vibration ripper, a driving means such as an endless track or a wheel is provided at a lower portion of a vehicle body so as to enable self-driving, a boom capable of refraction, rotation, and lifting operation is mounted on the front of the vehicle body so as to function like a human arm, and various tool equipment required according to the workability are mounted on an end of the boom.

Recently, an example of an excavator for increasing the breaking force by adding a vibration function to the end of the boom has been proposed.

As the example, the Republic of Korea Patent Publication No. 10-2009-0054513 "Vibration Ripper" is disclosed.

FIG. 8 is a view of the related art.

As shown in FIG. 8, when looking at a conventional vibration ripper, the conventional vibration ripper includes a main body 13' having a vibration space portion 11' and a coupling portion 12' for connecting a boom 200' or an arm of a heavy equipment on an upper side thereof, a vibrating unit 20' located in the vibration space portion and installed with a vibrator 30', and a plurality of support means 40' supported by both sides of a housing 21' of the vibrating unit 20' and the corresponding main body 13' to vibratingly support the vibrating unit 20' with respect to the main body 13'.

In addition, the conventional vibration ripper includes a vibration ripper blade 100' installed in the housing 21' to extend downward, and a vibroisolating means 70' installed in the upper main body 13' of the vibration space portion 11' and dispersing vibration when the housing 21' and the main body 13' collide due to raising of the vibrating unit 20'.

Therefore, the related art is that the vibrating unit vibrates when the vibrator is operated, and accordingly, vibration force is generated in the vibration ripper.

However, in the related art, a driving motor is directly installed on the vibrator 30', and thus the size of the driving motor should also be increased when the scale of the main body 13' is increased, so that there is a problem that the overall size of the main body is increased and the capacity of the drive motor is also increased.

In addition, there is a disadvantage that it is difficult to prevent all vibrations that occur up and down, front and back, and left and right when the vibrator vibrates.

In order to solve the problems, the inventor of the present application filed a patent application (No. 10-2017-0091303) of "Vibration preventing device for heavy equipment tools" on Jul. 19, 2017.

The present invention is an improved patent of the patent application No. 10-2017-0091303, which is a technology capable of further maximizing the vibration effect.

RELATED ART LITERATURE

Patent Literature (Patent Document 1) 1. Korean Laid-open Patent Application No. 10-1461597 (Nov. 7, 2014)

DISCLOSURE

Technical Problem

An object of the present invention is designed to solve the above-described problems and is to provide a vibration ripper having a link structure with an improved vibration isolating function that prevents a vibration body installed inside an outer body from shaking up and down, front and back, and left and right during vibration.

Another object of the present invention is to provide a vibration ripper having a link structure with an improved vibration isolating function capable of more efficiently dispersing vibration generated when the vibration is generated by a lifting operation of a vibration body installed inside an outer body.

Technical Solution

In order to achieve the object, a vibration ripper having a link structure with an improved vibration isolating function according to the present invention includes an outer body having an accommodating portion inside and a vibration body that is built in the outer body and has a mounting bracket formed thereunder so that a tool equipment may be attached and detached.

The vibration ripper includes a first vibroisolating body installed across the vibration body at a lower left portion of the vibration body, and a link device connecting the outer body and the first vibroisolating body in order to absorb vibration.

The link device includes a pair of parallel connection members in a state of being spaced apart from each other, a coupling hole for coupling the first vibroisolating body is formed on a left side of the connection member, and a second vibroisolating body coupled to the outer body is integrally installed on a right side of the connection member.

The first vibroisolating body includes a first outer housing fixed across the front and back of a lower left end of the vibration body, a first inner housing located inside the first outer housing, a first shaft inserted through the first inner housing, and a first elastic member installed between the first outer housing and the first inner housing.

The first elastic member is strongly coupled to the first outer housing and the first inner housing by a fixing key.

The left side of the pair of connection members is open so that a lower portion of the vibration body provided with the first vibroisolating body is inserted, and the right side thereof is coupled to a lower right portion of the outer body while being integrally provided with the second vibroisolating body.

The second vibroisolating body includes a second outer housing that is fixed across the front and back of a lower right end of the outer body, a second inner housing located inside the second outer housing, a second shaft inserted through the second inner housing, and a second elastic member installed between the second outer housing and the second inner housing.

The first vibroisolating body and the second vibroisolating body are provided only on one side with the link device interposed therebetween.

The vibration ripper further includes an upper vibroisolating body between the outer body and the vibration body on an upper end of the vibration ripper, and the upper vibroisolating body is installed in pairs in the front and back with the vibration body interposed therebetween.

The upper vibroisolating body includes an inner rim fixed to a fixed plate integrally installed on an upper left side or right side of the vibration body, an outer rim fixed to the outer body, and a vibroisolating member fixedly installed between the inner rim and the outer rim.

A third vibroisolating body is installed between an upper surface of the vibration body and the outer body, a fourth vibroisolating body is installed between a right side of the vibration body and the outer body, and the third vibroisolating body and the fourth vibroisolating body are formed by an air cushion method of filling with gas.

One side of the fourth vibroisolating body is fixed to the vibration body and the other side thereof is fixed to the outer body.

The fourth vibroisolating body includes a cushion part that may be filled with gas to provide a cushion.

The fourth vibroisolating body includes a case in which the cushion part is built for mounting between the vibration body and the outer body.

A first fixing piece for coupling to the vibration body is formed on one side of the case, and a second fixing piece for coupling to the outer body is formed on the other side thereof.

Advantageous Effects

According to the present invention, there is an effect that it is possible to prevent a vibration body installed inside an outer body from shaking up and down, front and back, and left and right when vibrating.

In addition, according to the present invention, there is an effect that it is possible to more effectively disperse the vibration generated when the vibration is generated by lifting operation of the vibration body installed inside the outer body.

DESCRIPTION OF REFERENCE NUMERALS

Figure 1:
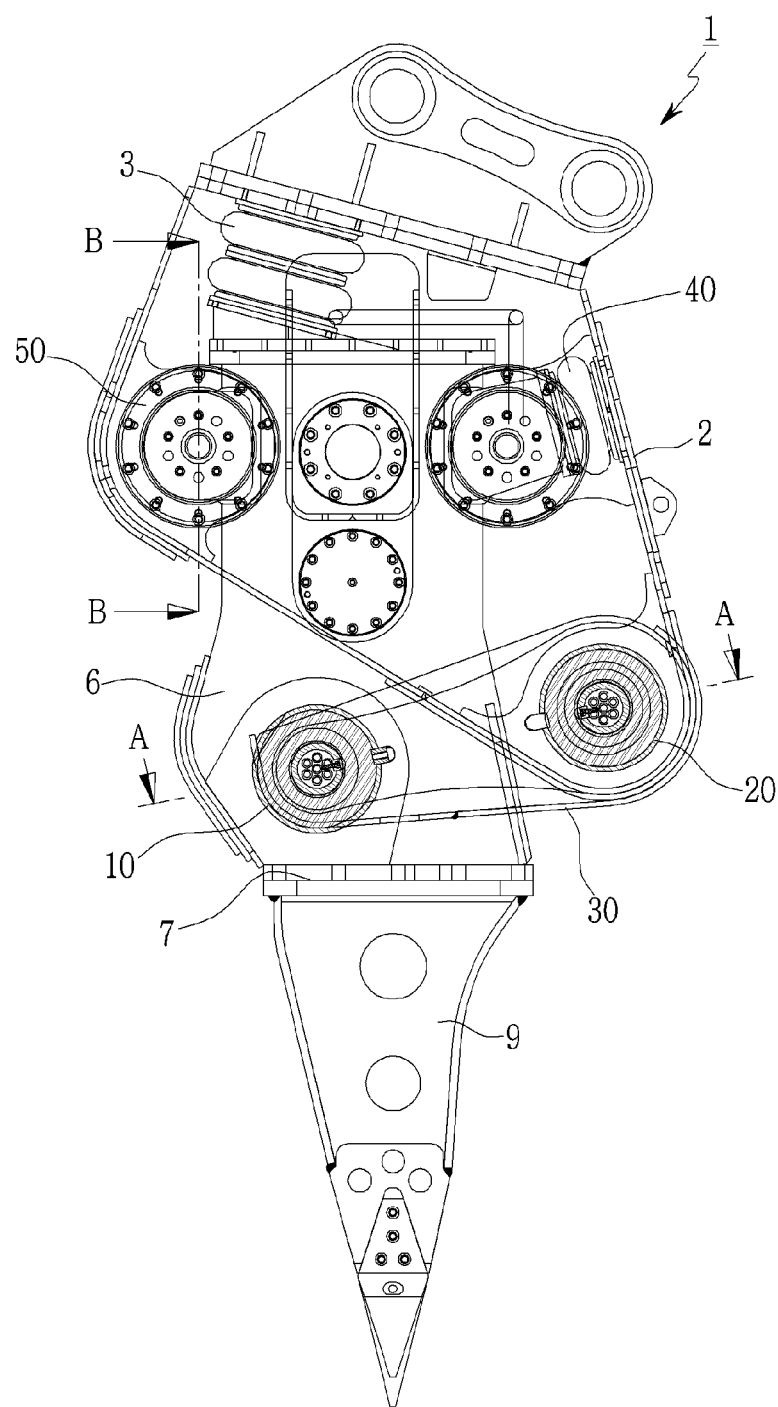
FIG. 1 is a schematic diagram of a vibration ripper having a link structure with an improved vibration isolating function according to the present invention.

1: Vibration ripper 2: Outer body
6: Vibration body 9: Tooth
10: First vibroisolating body 11: First outer housing
13: First inner housing 15: First elastic member
17: First shaft 19: Bolt
20: Second vibroisolating body 21: Second outer housing
23: Second inner housing 25: Second elastic member
27: Second shaft 30: Link device
31: Connection member 35: Fixing key
51: Inner rim 53: Outer rim
55: Vibroisolating member 57: Central axis
59: Fixing plate

MODES OF THE INVENTION

Hereinafter, preferred embodiments of the present invention will be described in detail based on the accompanying drawings.

Prior to this, terms to be described later are defined in consideration of functions in the present invention, which clearly indicates that they should be interpreted in terms of concepts consistent with the technological spirit of the present invention and commonly recognized or commonly recognized in the art.

In addition, when it is determined that a detailed description of a known function or configuration related to the present invention may obscure the subject matter of the present invention, the detailed description will be omitted.

Here, the accompanying drawings are exaggerated or simplified for a convenience and clarity of description and understanding of the structure and operation of the technology, and each component does not exactly match the actual size.

The vibration ripper having a link structure with an improved vibration isolating function according to the present invention may be used where rock is crushed using vibration.

FIG. 1 is a schematic diagram of a vibration ripper having a link structure with an improved vibration isolating function according to the present invention.

For convenience of description, the left and right directions are indicated as "left and right directions" around a shape of a vibration ripper 1 shown in FIG. 1, and the up and down directions of the vibration ripper are indicated as "up and down directions", and the front and back directions of the ground are indicated as "front-to-back direction".

In the present invention, the vibration ripper 1 which is a heavy equipment tool is mounted on an excavator or the like to use, and includes an outer body 2 having an accommodating portion inside and a vibration body 6 that is built in the outer body 2 and has a mounting bracket 7 formed thereunder so that a tool equipment may be attached and detached.

In the present invention, a tooth 9 is installed on the mounting bracket 7, and the tooth 9 is capable of crushing an object such as rock by vibration of the vibration body.

The vibration body 6 is a box body composed of a plurality of support plates so as to have a space therein, which is inserted inside the outer body 2, and the vibration body 6 includes a first eccentric member (not shown), a second eccentric member (not shown), and a reducer (not shown) therein. In this case, the first eccentric member, the second eccentric member, and the reducer are meshed with gears to operate in cooperation with each other.

The vibration body is a configuration that is conventionally mounted and used, and a specific description thereof will not be given.

In addition, as shown in FIG. 1, a first vibroisolating body 10 may be installed at a lower left end of the vibration body 6.

The first vibroisolating body 10 includes a first outer housing 11 fixed across the front and back of a lower left end of the vibration body 6, a first inner housing 13 located inside the first outer housing 11, a first shaft 17 inserted through the first inner housing 13, and a first elastic member 15 installed between the first outer housing 11 and the first inner housing 13.

Figure 5:
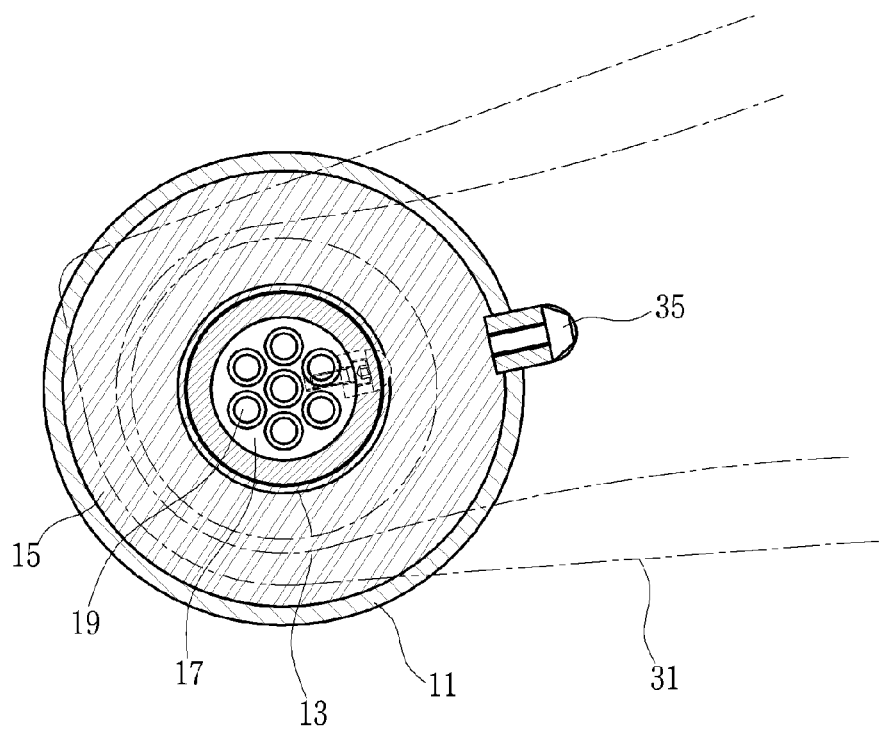
FIG. 5 is a perspective view showing a vibroisolating member of a vibration shaft built in the vibration body of FIG. 4.
Figure 6:
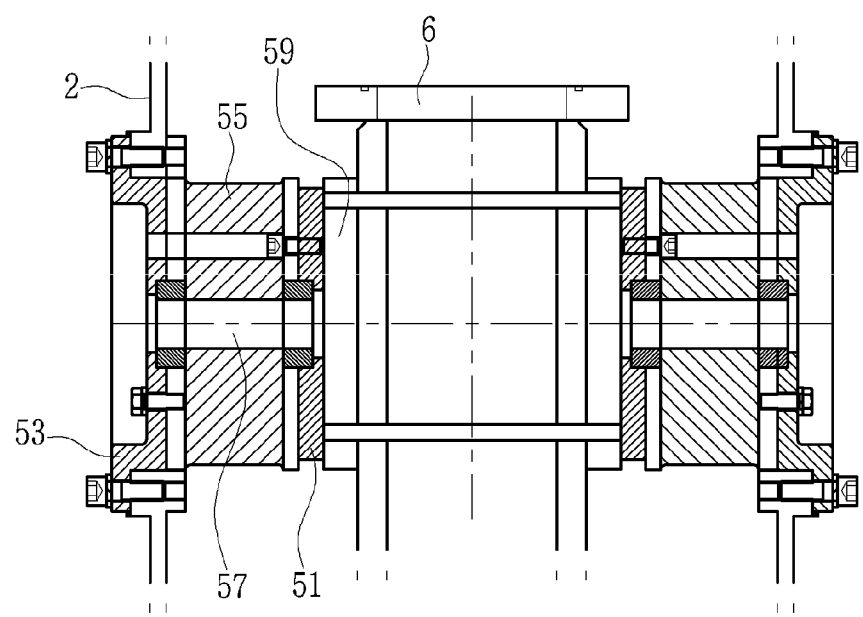
FIG. 6 is a cross-sectional view taken along line "B-B" of FIG. 1.

At this time, the first elastic member 15 may be strongly coupled to the first outer housing 13 and the first inner housing 15 by a fixing key 35 as shown in FIG. 5, and may be coupled by an adhesive means such as a separate adhesive. Therefore, the movement of the compressive force or tensile force generated by the first elastic member 15 may be restricted by the first outer housing 13 and the first inner housing 15.

The first outer housing 11 and the first inner housing 13 are made of a rigid material, and the first elastic member 15 may be a circular elastic rubber or a hollow tube-shaped elastic material.

The first shaft 17 is installed through the vibration body 6. That is, the first shaft 17 may be inserted into and fixed to the first inner housing 13 of the first vibroisolating body 10, which may have a form in which the first vibroisolating body 10 surrounds the outer circumferential surface of the first shaft. 17.

In addition, the first outer housing 11 of the first vibroisolating body 10 may be supported by being coupled to the vibration body 6 by welding or the like. Further, the first outer housing 11 and the first inner housing 13 may be made of a rigid body such as steel, and may be made of materials other than steel as long as they are rigid.

Figure 2:
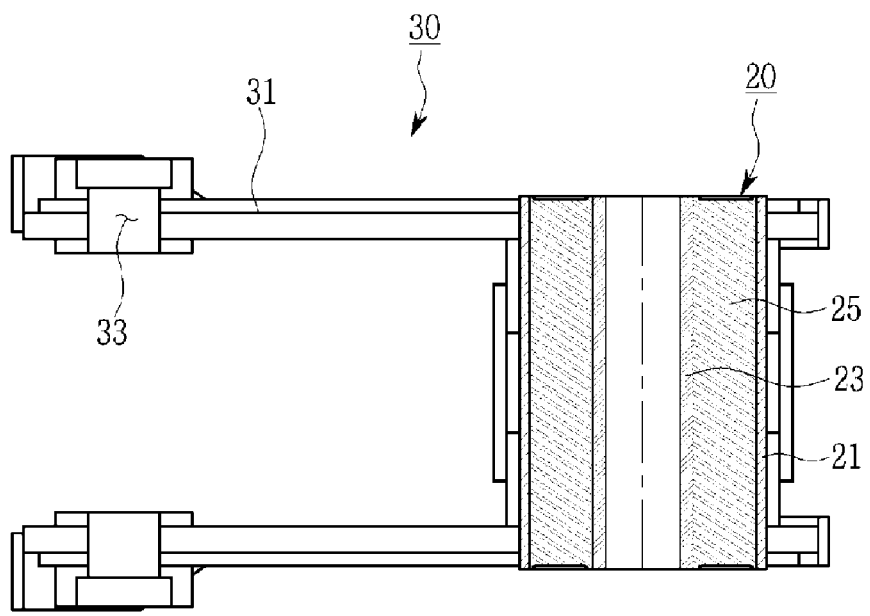
FIG. 2 is an enlarged view of a link device in the link structure with the improved vibration isolating function according to the present invention.

FIG. 2 is an enlarged view of a link device in the link structure with the improved vibration isolating function according to the present invention.

Referring to FIG. 2, a link device 30 according to the present invention may absorb vibration and impact by connecting the outer body 2 and the first vibroisolating body 10 of the vibration body 6.

The link device 30 includes a pair of parallel connection members 31 in a state of being spaced apart from each other. A coupling hole 33 for coupling the first vibroisolating body 10 is formed on a left side of the connection member 31, and a second vibroisolating body 20 coupled to the outer body 2 is integrally installed on a right side of the connection member 31.

That is, the left side of the pair of connection members 31 is open so that a lower portion of the vibration body 6 provided with the first vibroisolating body 10 may be inserted, and the right side thereof may be coupled to a lower right portion of the outer body 2 while being integrally provided with the second vibroisolating body 20. At this time, referring to FIG. 3, both ends of the first shaft 17 of the first vibroisolating body 10 may be coupled to the coupling hole 33, and finally may be fixed to the connection member 31 by a fixing means such as a bolt 19.

In addition, the second vibroisolating body 20 includes a second outer housing 21 that is fixed across the front and back of a lower right end of the outer body 2, a second inner housing 23 located inside the second outer housing 21, a second shaft 27 inserted through the second inner housing 23, and a second elastic member 25 installed between the second outer housing 21 and the second inner housing 23.

At this time, the second elastic member 25 may be strongly coupled to the second outer housing 23 and the second inner housing 25 by the fixing key, and may be combined by an adhesive means such as a separate adhesive. Therefore, the movement of the compressive force or tensile force generated by the second elastic member 25 may be restricted by the second outer housing 23 and the second inner housing 25.

The second outer housing 21 and the second inner housing 23 are made of a rigid material, and the second elastic member 25 may be a circular elastic rubber or a hollow tube-shaped elastic material.

The second shaft 27 may be inserted into and fixed to the second inner housing 23 of the second vibroisolating body 20, which may have a form in which the second vibroisolating body 20 surrounds the outer circumferential surface of the second shaft 27.

In addition, the second outer housing 21 of the second vibroisolating body 20 may be supported by being coupled to the link device 30 and the outer body 2 by welding or the like. Further, the second outer housing 21 and the second inner housing 23 may be made of a rigid body such as steel, and may be made of materials other than steel as long as they are rigid.

Figure 3:
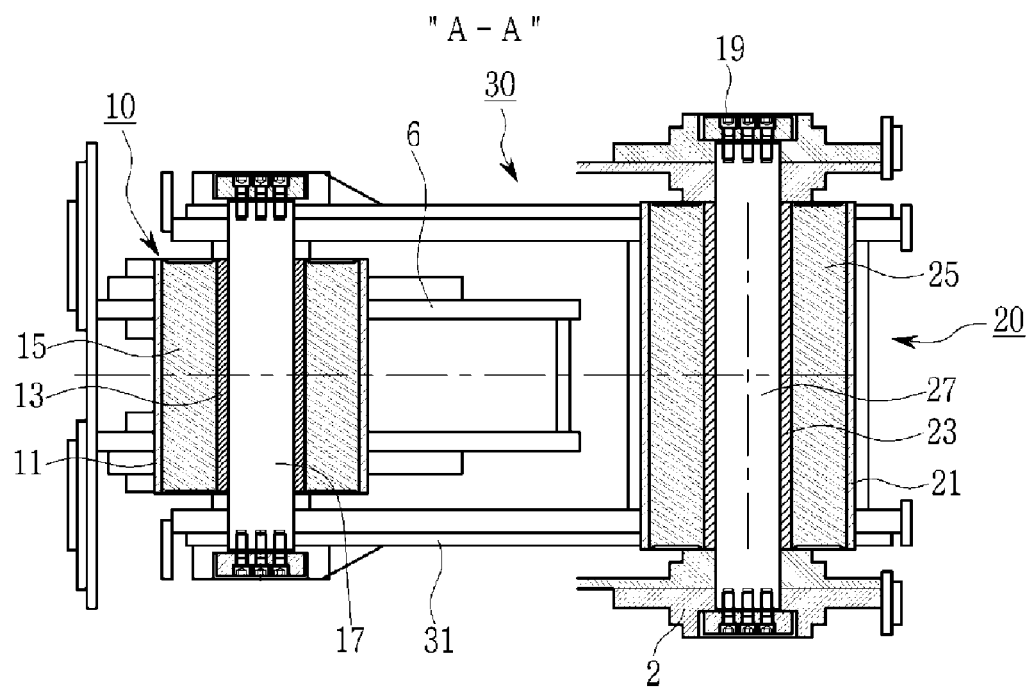
FIG. 3 is a cross-sectional view taken along line "A-A" of FIG. 1.
Figure 4:
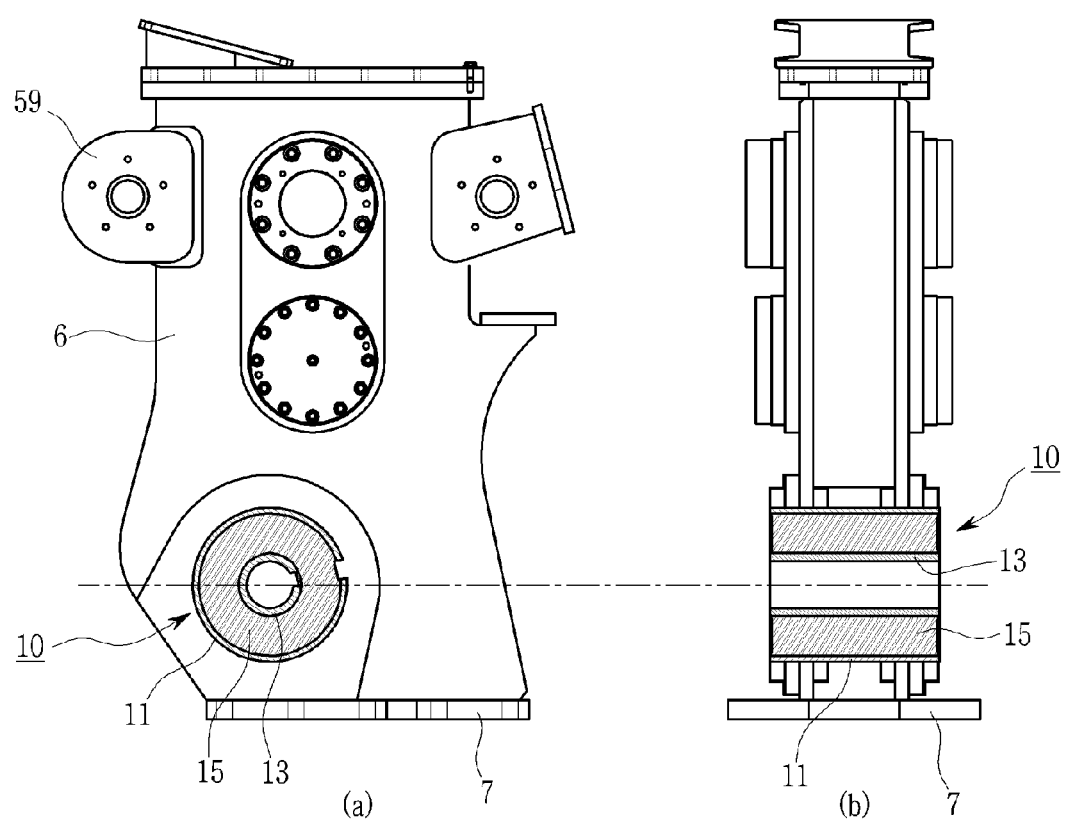
FIG. 4 is a cross-sectional view showing a vibration body in FIG. 1.

At this time, referring to FIG. 3, both ends of the second shaft 27 of the second vibroisolating body 20 may be fixed to the outer body 2 by fixing means such as a bolt 19.

As described above, the vibration ripper 1 according to the present invention has a structure in which the first vibroisolating body 10 and the second vibroisolating body 20 are connected to the vibration body 6 and the outer body 2 by the link device 30, and thus it is possible to more effectively and efficiently absorb the vibration generated by the vibration body 6 or the impact transmitted by the tooth 9, and to absorb all vibrations and impacts of up and down, front and back, and left and right.

In particular, a load in the left-right, front-back, and up-down directions generated in the vibration body 6 due to the coupling structure as described above, the first vibroisolating body 10 and the link device 30, the link device 30 and the second vibroisolating body 20, and all of these intermechanical relationship may be fixed in the 360-degree direction to perform vibroisolating.

In addition, the first vibroisolating body 10 and the second vibroisolating body 20 may be provided on only one side with the link device 30 interposed therebetween, or may be provided on both sides of the link device 30. Although the present invention describes that the first vibroisolating body and the second vibroisolating body are installed on both sides of the link device 30, the rights of the present invention are not limited thereto. That is, the elastic member may not be provided in the first vibroisolating body or the second vibroisolating body, or may be provided to both.

An upper vibroisolating body 50 may be further installed between the outer body 2 and the vibration body 6 on an upper end of the vibration ripper 1 according to the present invention.

The upper vibroisolating body 50 may be installed in pairs in the front and back with the vibration body 6 interposed therebetween, and the upper vibroisolating body 50 may be installed on a left or right side of the vibration body 6, respectively, or may be installed on both the left and right sides.

In addition, the upper vibroisolating body 50 is fixed to a fixing plate 59 integrally installed on an upper left side or right side of the vibration body 6.

The upper vibroisolating body 50 includes an inner rim 51 fixed to the fixing plate 59, an outer rim 53 fixed to the outer body 2, and a vibroisolating member 55 fixedly installed between the inner rim 51 and the outer rim 53.

A central axis 57 is inserted into the center of the inner rim 51, the vibroisolating member 55, and the outer rim 53.

All of the outer body 2, the upper vibroisolating body 50, and the fixing plate 59 of the vibration body 6 may be firmly fixed by coupling means such as bolts.

Therefore, it is possible to absorb vibration or impact of the vibration ripper 1 secondarily by the upper vibroisolating body 50.

In addition, a gas type third vibroisolating body 3 is installed in a space between an upper surface of the vibration body 6 and the outer body 2, wherein the third vibroisolating body 3 may be composed of an air cushion system in which gas is filled.

Figure 7:
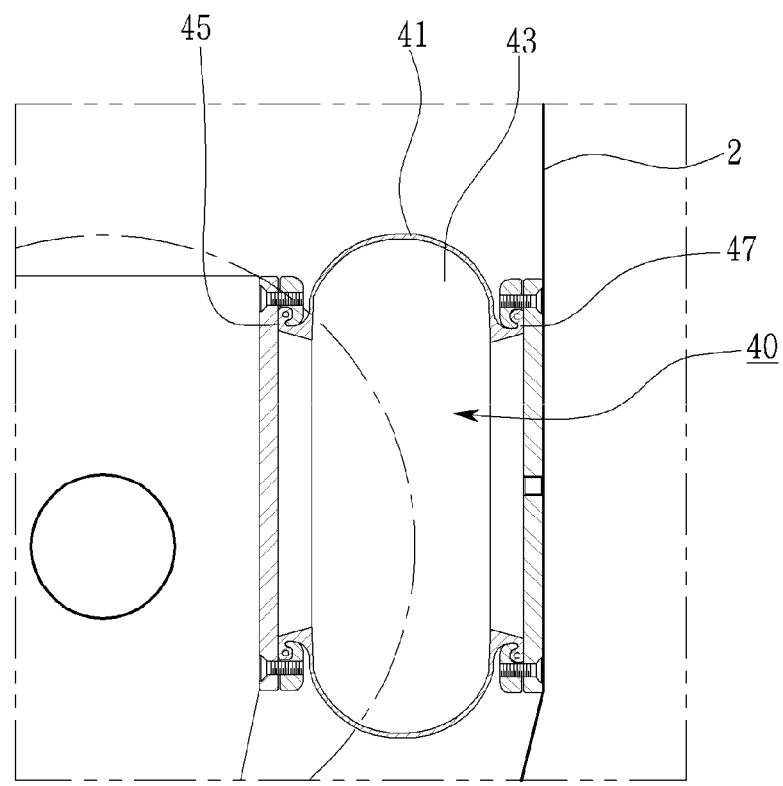
FIG. 7 is an enlarged view of a fourth vibroisolating body according to the present invention.
Figure 8:
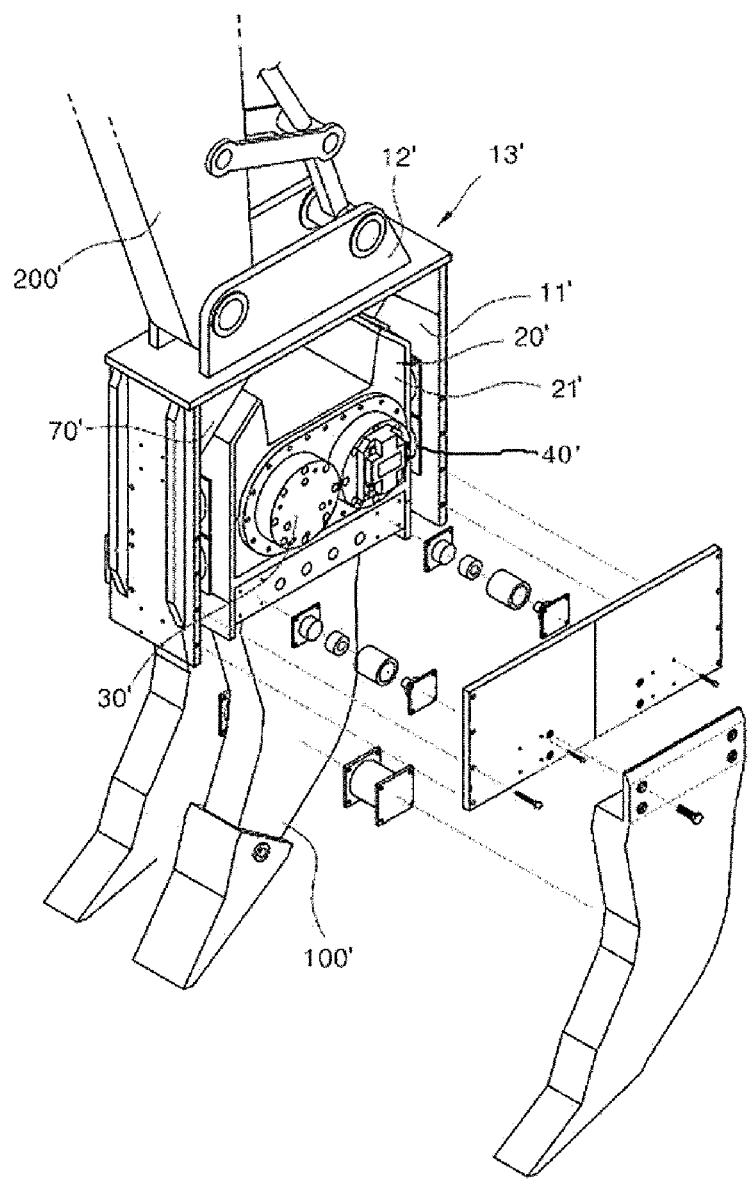
FIG. 8 is a view of the related art.

Meanwhile, referring to FIG. 7, in order to further maximize the vibroisolating effect, a fourth vibroisolating body 40 may be further installed at at least one location on the left and right sides of the heavy equipment tool. The fourth vibroisolating body 40 may be formed by an air cushion method of filling with gas. The fourth vibroisolating body 40 performs secondary vibroisolating so as to minimize vibration in the left and right directions of the vibration body 6.

At this time, the fourth vibroisolating body 40 may be installed in both a lower left end and upper right end of the vibration body 6, or may be installed in only one of the lower left end and upper right end of the vibration body 6.

The fourth vibroisolating body 40 has one side fixed to the vibration body 6 and the other side fixed to the outer body 2.

That is, the fourth vibroisolating body 40 includes a cushion part 43 that may be filled with gas to provide a cushion, and a case 41 in which the cushion part 43 is built for mounting between the vibration body 6 and the outer body 2.

A first fixing piece 45 for coupling to the vibration body 6 is formed on one side of the case 41, and a second fixing piece 47 for coupling to the outer body 2 is formed on the other side.

Therefore, the first fixing piece 45 and the second fixing piece 47 may be coupled to the vibration body 6 and the outer body 2 respectively by separate fixing means (for example, bolts).

Hereinafter, an operation of the vibration ripper having a link structure with an improved vibration isolating function according to the present invention will be described in detail.

When an operator operates the vibration body 6 of the tool in order to crush an object such as rock, the upper and lower vibrations of the vibration body 6 are transmitted to the tooth 9 to crush the object.

At this time, the vibration generated from the vibration body 6 and the impact generated when the object is crushed are transmitted to the first vibroisolating body 10 through the vibration body 6, and are transmitted to the second vibroisolating body 20 through the link device 30 connected to the first vibroisolating body 10.

First, vibration and impact transmitted to the first vibroisolating body 10 are absorbed by the first elastic member 15, and the first elastic member 15 may absorb impact by restricting its movements in the up and down, left and right, and front and back directions by the first outer housing 11 and the first inner housing 13. In particular, the first vibroisolating body 10 is composed of a first outer housing made of a rigid body, a first elastic member made of rubber or urethane, and a first inner housing made of a rigid body so as to be strongly joined to each other, and accordingly, when a force acts on the inside, the first elastic member 15 of the first vibroisolating body 10 simultaneously generates compression and tension in the direction of the force, thereby minimizing the displacement of the first elastic member 15.

In addition, vibration and impact may also be absorbed through the link device 30 connected to the first vibroisolating body 10. That is, the link device 30 may absorb up and down and left and right vibrations by the interaction of the connection member 31 connecting the first and second vibroisolating bodies 10 and 20.

In addition, similarly to the operation of the components of the first vibroisolating body 10, the vibration and impact transmitted to the second vibroisolating body 20 are absorbed by the action of the second outer housing 21, the second inner housing 23, and the second elastic member 25, and the second shaft 27 is fixedly installed on the outer body 2 and its movement in the front-rear direction is restricted, and thus the second vibroisolating body 20 may absorb the impact.

Finally, the upper vibroisolating body 50 is installed over the outer body 2 and the vibration body 6, and may perform secondary vibroisolating so as to minimize the vibration and impact of the vibration body or the outer body.

That is, the vibration or impact transmitted to the first vibroisolating body 10, the second vibroisolating body 20, the link device 30, and the upper vibroisolating body 50 may be generated in any direction such as up-down direction, front-back direction, or left-right direction with respect to the outer body 2, and the vibration preventing device according to the present invention may completely absorb and remove vibration or impact from any directions.

Although the preferred embodiments of the present invention have been described in detail above, the scope of the present invention is not limited thereto, and various modifications and improvements of those skilled in the art using the basic concept of the present invention defined in the following claims also belong to the scope of rights of the present invention.

The invention claimed is:

1. A vibration ripper having a link structure with a vibration isolating function, comprising:
   an outer body having an accommodating portion inside;
   a vibration body that is built in the outer body and has a mounting bracket formed underneath of the vibration body so that a tool equipment is capable of being attached and detached;
   a first vibroisolating body installed across the vibration body at a lower left portion of the vibration body, wherein an entire of the first vibroisolating body is within a horizontal length of the vibration body;
   a link device connecting the outer body and the first vibroisolating body in order to absorb vibration,
   wherein the link device includes a pair of parallel connection members in a state of being spaced apart from each other, the pair of parallel connection members comprising a left side connection member and a right side connection member; and a coupling hole for coupling the first vibroisolating body is formed on the left side connection member, and a second vibroisolating body coupled to the outer body is integrally installed on the right side connection member, wherein the first vibroisolating body includes:
a first outer housing fixed across a front and back of a lower left end of the vibration body;
a first inner housing located inside the first outer housing;
a first shaft inserted through the first inner housing; and
a first elastic member installed between the first outer housing and the first inner housing, wherein the first elastic member is coupled to the first outer housing and the first inner housing by a fixing key, wherein the fixing key is inserted in the first outer housing so that one end of the fixing key directly contacts with the first elastic member.

2. The vibration ripper of claim 1,
wherein the left side connection member is open so that a lower portion of the vibration body provided with the first vibroisolating body is inserted, and the right side connection member is coupled to a lower right portion of the outer body while being integrally provided with the second vibroisolating body.

3. The vibration ripper of claim 1,
wherein the second vibroisolating body includes:
a second outer housing that is fixed across a front and back of a lower right end of the outer body;
a second inner housing located inside the second outer housing;
a second shaft inserted through the second inner housing; and
a second elastic member installed between the second outer housing and the second inner housing.

4. The vibration ripper of claim 1, wherein the first vibroisolating body and the second vibroisolating body are provided on the same side with the link device interposed therebetween.

5. The vibration ripper of claim 4, further comprising
an upper vibroisolating body between the outer body and the vibration body on an upper end of the vibration ripper,
wherein the upper vibroisolating body is installed in pairs in a front and back with the vibration body interposed therebetween.

6. The vibration ripper of claim 5,
wherein the upper vibroisolating body includes:
an inner rim fixed to a fixed plate integrally installed on an upper left side or right side of the vibration body;
an outer rim fixed to the outer body; and
a vibroisolating member fixedly installed between the inner rim and the outer rim.

7. The vibration ripper of claim 1, wherein a third vibroisolating body is installed between an upper surface of the vibration body and the outer body,
a fourth vibroisolating body is installed between a right side of the vibration body and the outer body, and
the third vibroisolating body and the fourth vibroisolating body are formed by an air cushion method.

8. The vibration ripper of claim 7, wherein one side of the fourth vibroisolating body is fixed to the vibration body and the other side thereof is fixed to the outer body, and
the fourth vibroisolating body includes:
a cushion part filled with air to provide a cushion; and
a case in which the cushion part is built for mounting between the vibration body and the outer body, and
a first fixing piece for coupling to the vibration body is formed on one side of the case, and a second fixing piece for coupling to the outer body is formed on the other side thereof.

* * * * *